United States Patent
Palmer

(10) Patent No.: US 9,395,549 B2
(45) Date of Patent: Jul. 19, 2016

(54) STEREOSCOPIC THREE DIMENSIONAL IMAGING SYSTEM

(71) Applicant: Volfoni R&D EURL, Villeneuve-Loubet (FR)

(72) Inventor: Stephen Palmer, Borlänge (SE)

(73) Assignee: Volfoni R&D Eurl, Villeneuve-Loubet (FR)

(*) Notice: Subject to any disclaimer, the term of this patent is extended or adjusted under 35 U.S.C. 154(b) by 0 days.

(21) Appl. No.: 14/572,053

(22) Filed: Dec. 16, 2014

(65) Prior Publication Data
US 2016/0170224 A1    Jun. 16, 2016

(51) Int. Cl.
*G02B 27/28* (2006.01)
*G02B 27/26* (2006.01)

(52) U.S. Cl.
CPC .................... *G02B 27/26* (2013.01)

(58) Field of Classification Search
CPC ...... G02B 27/26; G02B 27/28; G02B 27/286; G02B 27/2207; H04N 13/0434; H04N 13/0459; H04N 13/0203; H04N 13/0285
USPC ............... 359/462, 464, 465, 466; 345/7, 9
See application file for complete search history.

(56) References Cited

U.S. PATENT DOCUMENTS

| | | | |
|---|---|---|---|
| 4,792,850 A | 12/1988 | Liptoh et al. | |
| 7,479,933 B2 * | 1/2009 | Weissman | G02B 27/26 345/7 |
| 7,959,296 B2 | 6/2011 | Cowan et al. | |
| 2006/0291053 A1 | 12/2006 | Robinson et al. | |
| 2014/0218648 A1 | 8/2014 | Palmer | |

FOREIGN PATENT DOCUMENTS

WO    2013/017409    2/2013

* cited by examiner

*Primary Examiner* — Euncha Cherry
(74) *Attorney, Agent, or Firm* — Occhiuti & Rohlicek LLP

(57) ABSTRACT

A 3-d projection system including first and second projectors generates left and right eye image beams. There is a first beam-splitting element to split the left-eye image beam into a primary left-eye image beam and two secondary left-eye image-beams and a second beam-splitting element to split the right-eye image beam into a primary right-eye image beam and two secondary right-eye image beams. The primary and secondary image beams have first and second linear polarization states, respectively. There is a first optical quarter waveplate device configured to receive the primary left-eye image beam and two secondary left-eye image beams and to convert their linear polarization states to a first circular polarization orientation. There is a second optical quarter waveplate device configured to convert the primary right-eye image beam and two secondary right-eye image beams to a second circular polarization orientation. The first and second circular polarization orientations are mutually orthogonal.

11 Claims, 5 Drawing Sheets

Figure 1 (Prior-Art)

Figure 2 (Prior-Art)

Figure 3 (Prior-Art)

STEREOSCOPIC THREE DIMENSIONAL IMAGING SYSTEM

FIELD OF INVENTION

The present invention relates to a stereoscopic three dimensional ("3d") imaging system and more specifically to a dual projection stereoscopic imaging system using circular polarization.

BACKGROUND

There are a number of different technologies known for the creation of stereoscopic 3d images for cinema projection applications. One such technology described, for example, in US Patent No. 2006/0291053A1 dated 14 Jun., 2006 entitled "Achromatic Polarization Switches", uses a polarization modulator comprising one or more liquid crystal elements stacked together and placed directly in front of a projector. The projector is designed to generate a succession of alternating left-eye and right-eye images at high frequencies, typically 144 Hz. The polarization modulator imparts an optical polarization state to the succession of left-eye and right-eye images.

Furthermore, by synchronization of the polarization modulator together with the succession of images being generated by the projector, the optical polarization states of the left-eye images and right-eye images are arranged so as to be mutually orthogonal. Thereafter, by focusing the images onto a polarization preserving projection screen, the observer is able to view time-multiplexed stereoscopic-3d images via utilisation of passive polarized viewing-goggles.

However, since a linear polarization filter is required to be mounted on the entrance surface of the polarization modulator, approximately 50% of the initially unpolarized incident light generated by a typical cinema projector is absorbed. In addition, the time-multiplexed duty-cycle for both the left-eye images and right-eye images emitted by the projector is only 50%. Therefore, the maximum theoretical optical light efficiency of such a stereoscopic-3d system is limited to being only 50%×50%=25%. Moreover, in practice the overall optical light efficiency of such systems may in fact be as low as typically only 18% due to there being additional optical losses, such as surface reflections, etc. This results in the generation of stereoscopic-3d images that are severely lacking in on-screen image brightness.

In order to improve the overall optical light efficiency of a stereoscopic-3d system, one technology is described, for example, in Patent Application No. PCT/EP2012/064069, dated 18 Jul. 2012, entitled "Device for polarizing a video sequence to be viewed stereoscopically". This system uses a beam-splitter arrangement placed directly in front of a projector in order to split the initially unpolarized incident light generated by the projector into two separate secondary image beams. The secondary image beams travelling in mutually opposite directions are also both orthogonal to the direction of the original in-coming incident light generated by the projector and said secondary image beams are linearly polarized in mutually orthogonal orientations, for example with the first image beam possessing s polarization and said second image beam possessing p polarization, respectively.

Thereafter, polarization modulators comprising one or more liquid crystal elements stacked together are used to modulate the polarization states of the secondary image beams and are arranged such that at any given instance in time both secondary image beams are imparted with mutually identical optical polarization states. Furthermore, the polarization modulators are synchronized together with the succession of left and right eye images generated by the projector and arranged such that the left and right eye images are optically polarized in mutually orthogonal orientations.

Both secondary image beams are thereafter mutually aligned using reflecting mirrors and focused onto a polarization preserving projection screen, thereby enabling the observer to view time-multiplexed stereoscopic-3d images via utilisation of passive polarized viewing-goggles.

In theory, since 100% of all light initially generated by the projector is reflected towards the projection screen when using the aforementioned prior-art technology, the maximum theoretical optical light efficiency will now be increased to a value of 100%×50%=50%. This is because the time-multiplexed duty-cycle for both the left and right eye images is still only 50%. This creates stereoscopic-3d images with an improved level of on-screen image brightness; however, in practice the overall optical light efficiency of such systems may be typically less than 30% due to the occurrence of other optical losses such as surface reflections.

Another prior-art system which further increases the optical light efficiency of a stereoscopic-3d projection system is described, for example, in U.S. Pat. No. 7,959,296 B2, dated 27 Dec., 2010, and entitled "Combining P and S rays for bright stereoscopic projection". With this system two individual projectors are placed together with the first projector generating only the left-eye images and the second projector generating only the right-eye images. It will be understood by one skilled in the art that in such arrangement the time-multiplexed duty-cycle for both the left and right eye images will now be increased to almost 100%.

Furthermore, when used together with a beam-splitting arrangement placed in front of each individual projector which, in theory diverts and reflects 100% of all incident light generated by each individual projector towards the projection screen, the overall theoretical optical light efficiency of such system will then be increased to 100%×100%=100%. However, in practice the optical light efficiency of such system is only approximately 50% due to the occurrence of optical losses such as surface reflections.

In aforementioned U.S. Pat. No. 7,959,296 B2, it is described how a single beam-splitting element, such as a planar wire-grid polarizer, can be placed directly in front of each individual projector to split the incident light beam emitted by each individual projector into two separate image beams. They include one primary beam with a first optical linear polarization state travelling in the same direction as the original incident light beam, and one secondary beam with a second optical linear polarization state travelling in an orthogonal direction to said original incident light beam. Thereafter, a mirror is used to reflect said secondary beam towards a projection screen and both primary and secondary image beams are thereby arranged so as to mutually overlap on the surface of the projection screen.

However, it will be understood by one skilled in the art that such an arrangement results in there being a relatively large difference in the optical path lengths for the primary and secondary beams. This requires either introducing an optical path length compensation element in the path of the primary beam, such as a telephoto lens pair, or using a deformable-mirror to reflect the secondary beam towards the projection-screen which introduces a high-level of optical image convergence, or using a combination of both methods thereof.

However, the use of a telephoto-lens pair for the primary-beam in order to compensate for the optical path length difference between said primary and secondary beams will reduce the overall optical light efficiency of the system due to the occurrence of optical losses such as surface reflections. In addition to this, it will be understood by one skilled in the art that the utilisation of a deformable mirror in order to generate a high level of image convergence for the secondary beam will result in the design of a relatively complex and expensive system.

It is also specifically described in the aforementioned U.S. Pat. No. 7,959,296 B2 how an optical polarization rotator is required for at least one of the primary and secondary beams in order to rotate the optical linear polarization state of at least one of said primary and secondary beams by 90 degrees. However, the incorporation of a polarization rotator will further reduce the overall optical light efficiency due to associated optical losses as well as adding both complexity and expense to the overall system.

SUMMARY OF INVENTION

In one aspect of the present invention, a dual projection system is disclosed for projecting a stereoscopic three dimensional image onto the surface of a projection screen and which includes a first projector configured to generate a left-eye image beam and a second projector configured to generate a right-eye image beam. There is a first beam-splitting element positioned in front of said first projector to split the left-eye image beam into a primary left-eye image beam with a first optical linear polarization state and two secondary left-eye image beams, each with a second optical linear polarization state. There is a second beam-splitting element positioned in front of said second projector to split the right-eye image beam into a primary right-eye image beam with said first optical linear polarization state and two secondary right-eye image beams, each with said second optical linear polarization state. There is also included a first optical quarter waveplate device configured to receive the primary left-eye image beam and two secondary left-eye image-beams and to convert their optical linear polarization states to a first circular polarization orientation for projection onto the surface of a projection screen. There is also a second optical quarter waveplate device configured to receive the primary right-eye image beam and two secondary right-eye image beams and to convert their optical linear polarization states to a second circular polarization orientation for projection onto the surface of said projection screen. The first circular polarization orientation is orthogonal (i.e possesses an opposite sense of rotation) to the second circular polarization orientation.

In other aspects of the disclosed invention, one or more of the following features can be included. The first beam-splitting element directs the primary left-eye image beam to travel in a direction substantially parallel to the left-eye image beam generated by said first projector and directs the two secondary left-eye image beams to travel in mutually opposite directions which are also orthogonal to said left-eye image beam. The second beam-splitting element directs the primary right-eye image beam to travel in a direction substantially parallel to the right-eye image beam generated by said second projector and directs the two secondary right-eye image beams to travel in mutually opposite directions which are also orthogonal to said right-eye image beam. The first and second beam-splitting elements each comprise two pieces of planar wire-grid polarizers which mutually connect to form a juncture along one straight edge at an angle of substantially 90 degrees. There can be included a first pair of reflecting mirrors which receive the two secondary left-eye image beams and direct them to travel in a direction parallel to said left-eye image beam generated by said first projector. There can also be included a second pair of reflecting mirrors which receive the two secondary right-eye image beams and direct them to travel in a direction parallel to said right-eye image beam generated by said second projector.

In yet other aspects of the disclosed invention, one or more of the following features may be included. The first optical quarter waveplate device includes an optical quarter waveplate element for each of the primary left-eye image beam and two secondary left-eye image beams to convert their optical linear polarization states to a first circular polarization orientation. The second optical quarter waveplate device includes an optical quarter waveplate element for each of the primary right-eye image beam and two secondary right-eye image beams to convert their optical linear polarization states to a second circular polarization orientation. The optical quarter waveplate elements of the first and second optical quarter waveplate devices are substantially achromatic. Furthermore, the optical quarter waveplate elements of the first and second optical quarter waveplate devices each include a stack of at least three separate uniaxially stretched retardation sheets. The first optical linear polarization state and said second optical linear polarization state are mutually orthogonal.

An object of the present invention is to provide a dual-projection stereoscopic-3d image system for cinema-applications offering an improved level of optical light efficiency and which is based on the use of passive circular-polarized viewing-goggles. A further object of the present invention is to provide a dual-projection stereoscopic-3d system with a reduced level of complexity, size and cost as compared to previous state-of-the-art technologies.

Another object of the present invention is the elimination of optical losses associated with the use of an optical path length compensation element such as but not limited to a telephoto-lens pair. Furthermore, another object is to mitigate the necessity of utilizing a polarization rotator in order to rotate the linear polarization state of the image beams by 90 degrees as described in other prior-art technologies. This further increases the optical light efficiency and reduces both the complexity and cost of the overall system.

DETAILED DESCRIPTION

Figure 1:
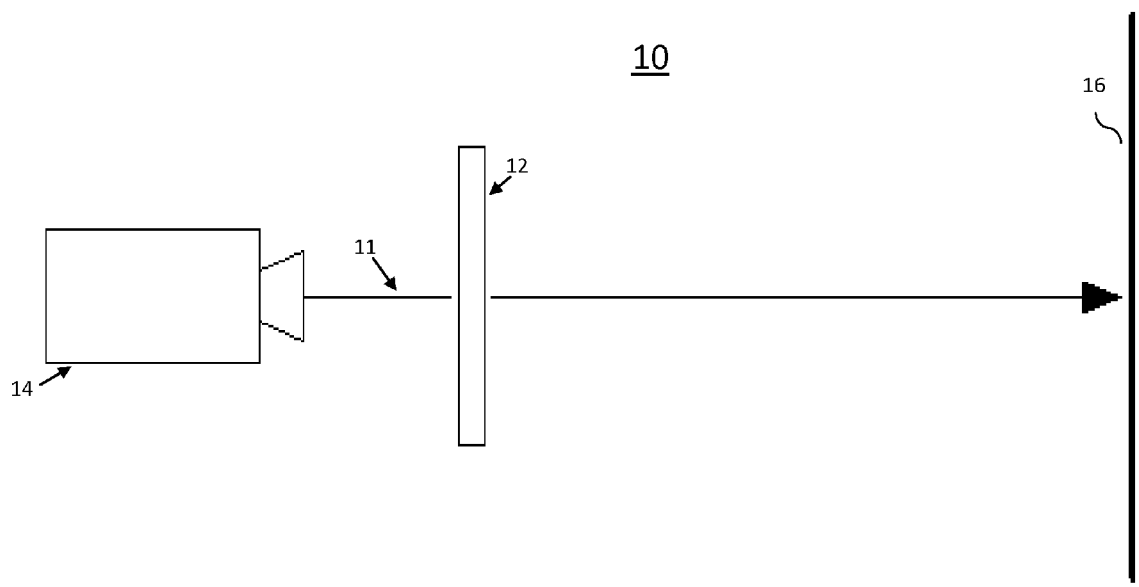
FIG. 1 is a schematic diagram of a prior-art stereoscopic-3d imaging system.

FIG. 1 shows a prior-art stereoscopic-3d cinema projection system 10 having a polarization modulator 12, such as that described, for example, in U.S. Pat. No. 4,792,850A dated 25 Nov., 1987 entitled "Method and system employing a push-pull liquid crystal modulator", comprising a stack of one or more liquid crystal elements placed directly in front of a digital cinema projector 14. Such digital cinema projectors typically comprise DLP projectors which generate unpolarized light and a linear polarization filter (not shown) is required to be applied to the front surface of said polarization modulator 12. Projector 14 generates an image beam 11 comprising a succession of alternate left and right eye images, at high frequencies typically 144 Hz. The polarization modulator 12 imparts a first optical polarization state to all left-eye images and a second optical polarization state to all right-eye images, respectively. The first and second polarization states are arranged to be mutually orthogonal.

Here, the image-beam 11 generated by the projector 14 is shown as being a single-line vector for ease of clarity. However, it will be understood by one of moderate skill in the art that the actual image-beam 11 generated by said projector 14 may in practice have some level of spreading or divergence over a range of angles of typically up to ±15 degrees in both the horizontal and vertical directions. However, the spreading of the image-beam 11 has no bearing on the inventive ideas disclosed herein and so in all following figures the image-beams have been represented by single-lines for ease of clarity.

Thereafter, the polarized left-eye images and right-eye images are focused onto the surface of a polarization preserving projection screen 16, such as a silver screen, and time-multiplexed stereoscopic-3d imagery can then be viewed via utilization of passive polarized viewing-goggles (not shown).

As noted above, since most cinema projectors currently on the market, such as DLP projectors, emit images that are initially unpolarized, the linear polarization filter required to be applied to the front surface of said polarization modulator 12 absorbs approximately 50% of the projected light. Furthermore, since the time-multiplexed duty-cycle for both the left-eye images and right-eye images is 50%, then the overall theoretical optical light efficiency of system 10 is approximately 50%×50%=25%. In practice, the overall optical light efficiency may be as low as typically only 18% due to the occurrence of optical losses, such as surface reflections, resulting in the generation of time-multiplexed stereoscopic-3d images that are severely lacking in on-screen image brightness.

Figure 2:
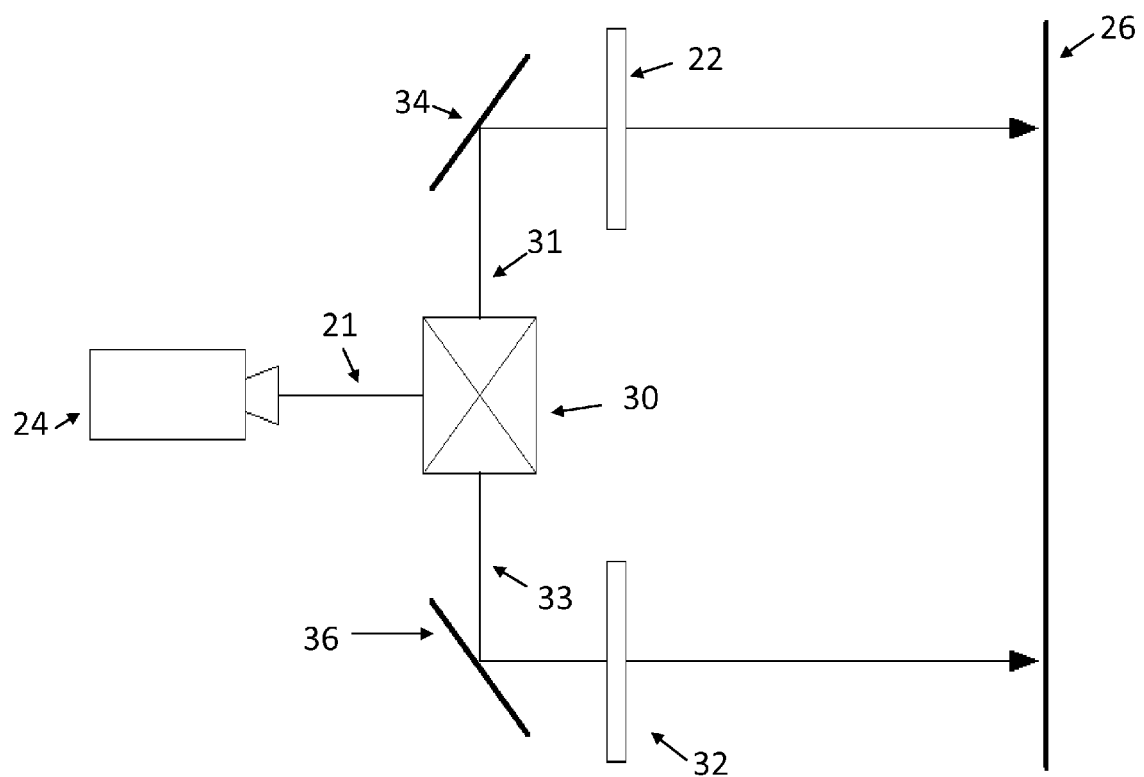
FIG. 2 is a schematic diagram of another prior-art stereoscopic-3d imaging system.

FIG. 2 shows an alternative prior-art stereoscopic-3d system 20 comprising a beam-splitter 30, such as a polarization x-cube as described, for example, in US Patent No. US20140218648A1 dated 18 Jul., 2012 entitled "Device for the polarization of a video sequence to he viewed in stereoscopy", which is placed directly in front of a cinema projector 24 of the type described in system 10, FIG. 1. Beam-splitter 30 splits the original incoming incident light 21 into two secondary beams 31, 33 travelling in mutually opposite directions. Secondary beams 31, 33 are also orthogonal to the direction of the original incoming incident light 21 generated by said projector 24. Projector 24 generates a succession of alternate left and right eye images at high frequencies, typically 144 Hz, in the same way as projector 14 of system 10.

The two secondary beams 31, 33 are linearly polarized in mutually orthogonal directions and are directed towards two deformable mirrors 34, 36 which reflect said secondary beams 31, 33 towards polarization modulators 22, 32, respectively. Polarization modulators 22, 32 are arranged so as to ensure both secondary beams are imparted with mutually identical polarization states at any instance in time. The images are then projected onto the surface of a polarization preserving projection screen 26, such as a silver screen or otherwise.

By synchronization of the secondary beams 31, 33 using polarization modulators 22, 32 together with the left and right eye images generated by the projector 24, all left-eye images are arranged to possess a first optical polarization state and all right-eye images are arranged to possess a second optical polarization state. The first and second polarization states are mutually orthogonal. With this arrangement, time-multiplexed stereoscopic-3d imagery can then be viewed via utilization of passive polarized viewing-goggles (not shown).

With system 20, in theory 100% of all light generated by projector 24 will be reflected towards the projection screen 26. However, the time-multiplexed duty cycle for both the left and right eye images will still be approximately 50%, resulting in the overall theoretical optical light efficiency for system 20 being 100%×50%=50%. However, in practice the overall optical light efficiency is reduced to typically less than 25% due to the occurrence of optical losses such as surface reflections. The resulting on-screen image brightness is nether-the-less still improved relative to system 10, but anyhow still rather low.

Figure 3:
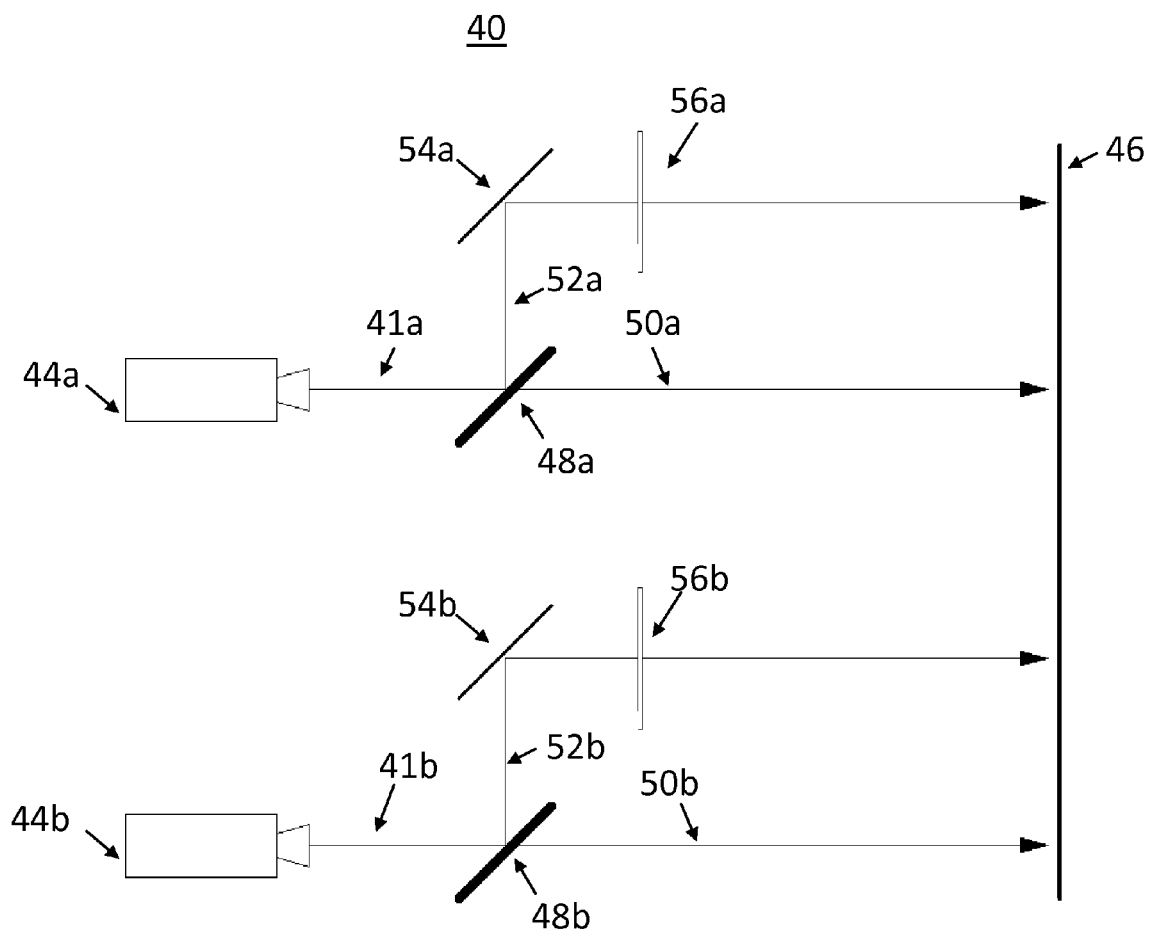
FIG. 3 is a schematic diagram of a prior-art dual projection stereoscopic-3d imaging system.

FIG. 3 shows another prior-art stereoscopic-3d system using two independent projectors 44a and 44b stacked together to form a dual projection system. The first projector 44a is arranged to generate only the left-eye images, and the second projector 44b is arranged to generate only the right-eye images, respectively. This dual projection arrangement increases the time-multiplexed duty-cycle for both the left and right eye images to approximately 100%. Each projector 44a,b may be of the type used in systems 10 and 20 of FIGS. 1 and 2, respectively.

Associated with and located in front of each projector 44a,b is a respective beam-splitter 48a and 48b. The beam-splitters 48a,b may comprise, for example, a planar wire-grid polarizer (WGP). The beam-splitters separate the original incoming incident light 41a,b from each individual projector 44a,b into primary beams 50a,b, respectively, travelling in the same direction as said original incoming incident light 41a,b, and one secondary beam 52a,b, respectively, travelling in a direction that is orthogonal to incoming incident light 41a,b.

Deformable mirrors 54a,b are used to reflect each individual secondary beam 52a,b, respectively, towards a polarization preserving projection screen 46 through a polarization rotator 56a,b. Polarization rotators 56a and 56b are used to rotate the optical linear polarization states of each individual secondary beam 52a,b respectively, by 90 degrees. Polarization rotators may alternatively be placed in the paths of primary beams 50a,b.

By mutually overlapping primary beams 50a,b together with secondary beams 52a,b generated by projectors 44a,b respectively, onto the surface of the projection screen 46, stereoscopic-3d images can be viewed via utilization of passive polarized viewing-goggles (not shown).

However, it will be understood by one skilled in the art that in this arrangement there will be a large difference in the optical path lengths between the primary beams 50a,b and secondary beams 52a,b, thereby requiring the use of an optical compensation element such as a telephoto lens pair (not shown) and this will reduce the overall optical light efficiency and increase the complexity and expense of the system.

In theory, since 100% of all original incident light 41a,b generated by each individual projector 44a,b is reflected towards the projection screen 46, as well as the fact that the time-multiplexed duty-cycle for each of the left and right eye images is now also 100%, the overall theoretical optical light efficiency of system 40 will be 100%×100%=100%. However, in practice the overall optical light efficiency is reduced to typically less than 50% due to the occurrence of optical losses such as surface reflections. However, the resulting on-screen image brightness is still nether-the-less improved over previous prior-art technologies as described herein over.

Figure 4:
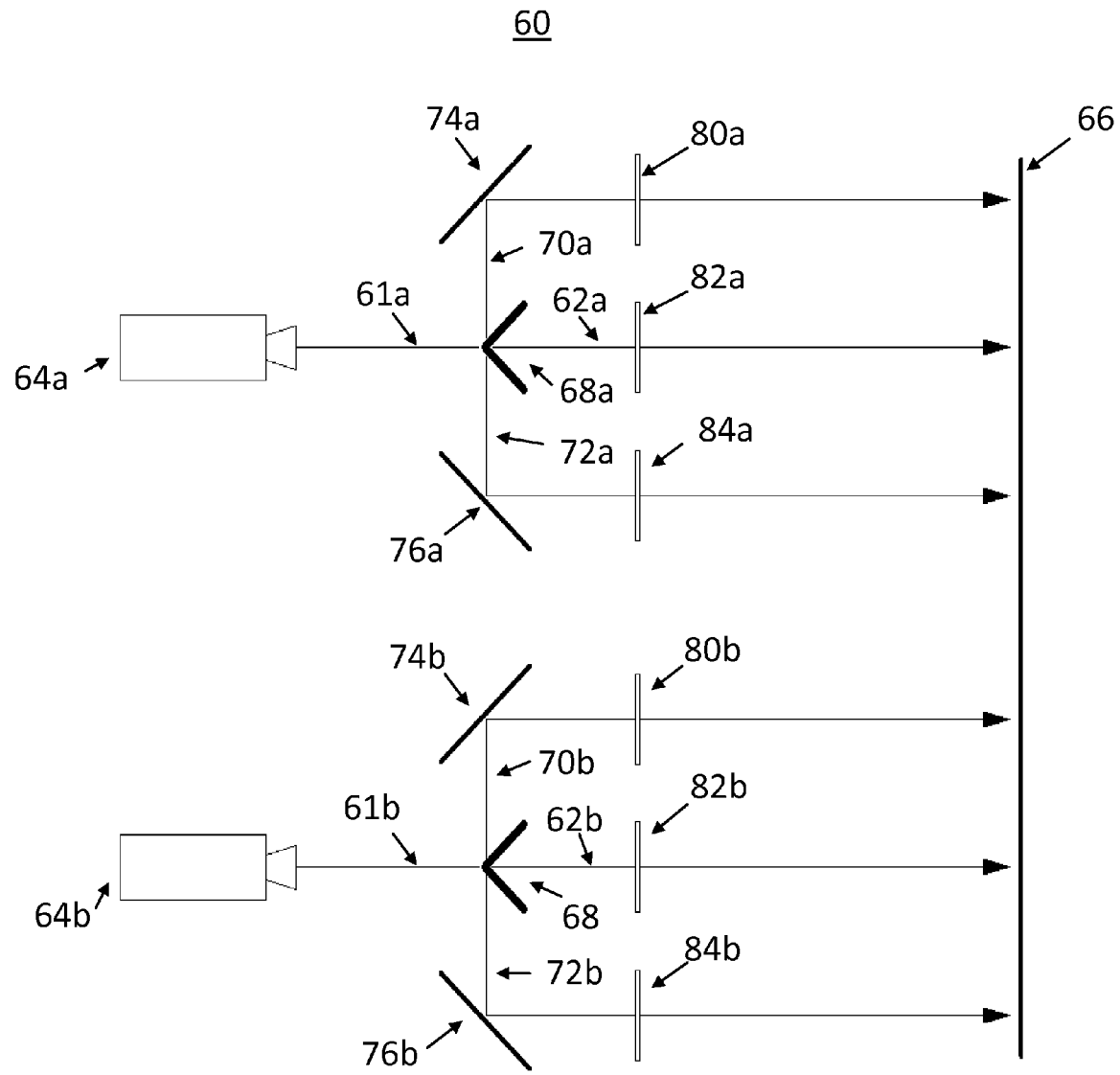
FIG. 4 is a schematic diagram of a dual projection stereoscopic-3d system according to this invention.

Stereoscopic-3d dual projection system, 60, FIG. 4, according to this invention includes two projectors 64a and 64b stacked together to form a dual projection system and arranged such that first projector 64a emits only the left-eye images and second projector 64b emits only the right-eye images, respectively. This dual projection arrangement increases the time-multiplexed duty-cycle for both the left and right eye images to approximately 100%. Each projector 64a,b may be of the same type used in systems 10, 20, and 40 of FIGS. 1, 2 and 3, respectively.

A beam-splitting element 68a,b is placed in front of each individual projector 64a,b, respectively, in order to split the incoming image beams 61a,b from each individual projector 64a,b, into three separate image beams. There are primary image beams 62a and 62b which are associated with projectors 64a and 64b, respectively, and which possess a first optical linear polarization state, for example but not limited to p polarization. The primary image beams 62a,b travel in principally the same direction as said original incoming incident beams 61a,b. There are also secondary image beams 70a and 72a associated with projector 64a and secondary image beams 70b and 72b associated with projector 64b. The secondary image beams 70a,b and 72a,b all have the same second optical linear polarization state, for example but not limited to s polarization, with said first and second linear polarization states being mutually orthogonal. Furthermore, secondary beams 70a,b travel in mutually opposite directions from secondary beams 72a,b and all secondary beams 70a,b and 72a,b travel in directions that are principally orthogonal to the direction of the original incoming incident beams 61a, b.

Deformable reflecting mirrors 74a,b and 76a,b are used to reflect both secondary image beams 70a,b and 72a,b respectively, towards a polarization preserving projection screen 66 such as a silver screen. Furthermore, there are separate achromatic optical quarter waveplate filters 80a, 82a, and 84a used to directly convert the linear polarization states of beams 70a, 62a, and 72a from projector 64a into circular polarization with a first sense of orientation or rotation. Also, achromatic optical quarter-waveplate filters 80b, 82b, and 84b are used to directly convert the linear polarization states of beams 70b, 62b, and 72b from projector 64b into circular polarization with a second sense of orientation or rotation, with first and second circular polarization orientations being mutually opposite or orthogonal. This ensures that all left-eye image beams 62a, 70a and 72a emitted by said first projector 64a are circular polarized in an opposite sense to all right-eye image beams 62b, 70b and 72b emitted by said second projector 64b without the necessity of using, for example, a polarization rotator which would otherwise reduce the overall optical light efficiency due to the occurrence of optical losses. The primary and secondary beams from each projector 64a,b are now arranged to mutually overlap on the surface of the projection screen 66 via utilization of deformable reflecting mirrors 74a,b and 76a,b respectively. Since left and right eye images are now imparted with circular polarization states possessing opposite or orthogonal senses of rotations, stereoscopic-3d images can be viewed via utilization of passive circular polarized viewing-goggles (not shown).

It will be understood by one skilled in the art that by splitting the original incoming light beam 61a,b from each individual projector 64a,b into three separate image beams, the beam-splitters 68a,b can be designed to be significantly smaller than that used by prior-art technologies. This significantly reduces the difference in optical path lengths between the primary and secondary beams, thereby eliminating the necessity to use for example a telephoto lens pair, as required by other prior-art technologies, and hence increasing the resulting overall optical light efficiency.

It will also be understood by one skilled in the art that by using an optical quarter waveplate such as a single film of unixially-stretched retardation-film with birefringent value close to 140 nm to directly convert the linear polarization states of the primary and secondary image beams emitted by each individual projector 64a,b to circular polarization, the necessity of using a polarization rotator, as described in other prior-art technologies, is eliminated. This further increases the overall optical light efficiency and reduces the complexity and expense of the overall system. However, the use of a single-layer of retardation film with birefringent value close to 140 nm may not be optimum since the properties of such film will be chromatic (i.e a single layer of retardation film will have different characteristics for the different colours or wavelengths of light), resulting in an increased level of on-screen ghosting or cross-talk.

However, it will be understood by one skilled in the art that achromatic optical quarter waveplates can be designed by stacking together three or more individual sheets of uniaxially stretched retardation-films with each individual sheet possessing a specific value of retardation (given in units of nanometers) and orientation of optical axis (given in units of degrees). Moreover, the design of the retardation stack can be optimised so as to maximise the degree of circular polarization for each of the primary 62a,b and secondary 70a,b and 72a,b image beams for each of the individual projectors 64a, b, thereby minimizing the level of on-screen ghosting or cross-talk.

Figure 5:
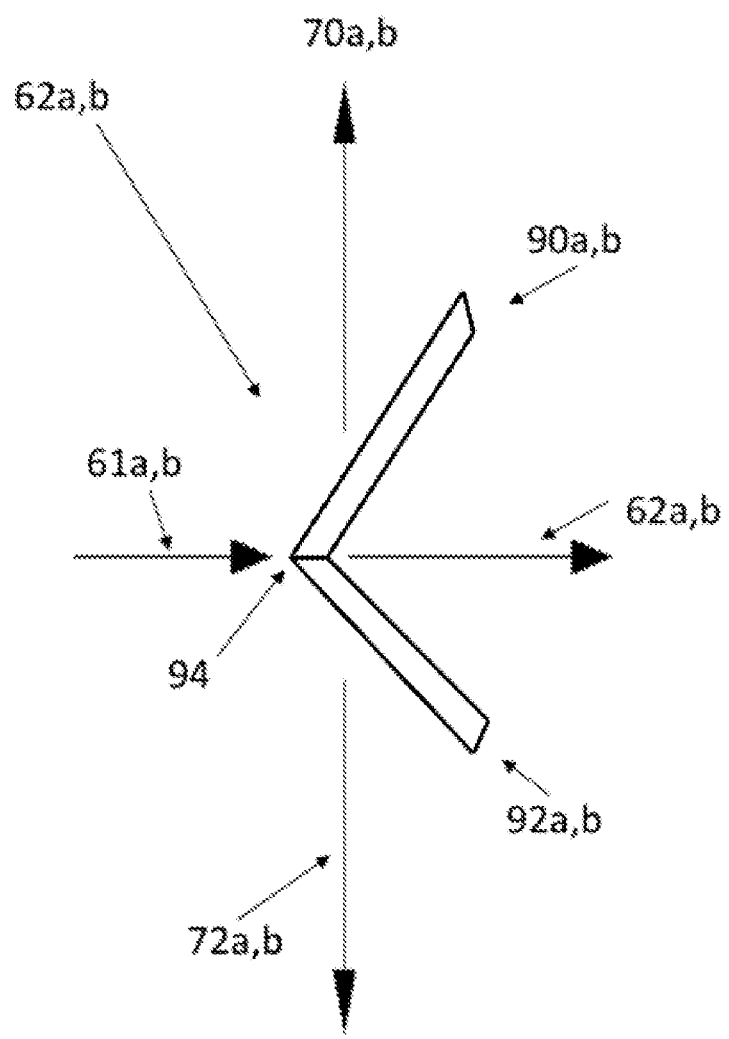
FIG. 5 is an enlarged schematic diagram of the beam-splitting element depicted in FIG. 4.

Beam-splitting element 68a,b is shown in more detail in FIG. 5 to include two separate pieces of planar wire-grid polarizers 90a,b, 92a,b placed together and arranged such that said pieces of wire-grid polarizers 90a,b, 92a,b mutually connect to form a juncture along one straight edge at an angle of substantially 90 degrees.

Furthermore, the original incoming incident image-beam 61a,b from the projector 64a,b is arranged so as to impinge close to the intersection 94 of the pieces of wire grid polarizers 90a,b and 92a,b in a direction being substantially parallel to the angular bisector of said pieces. The intersecting edges of the two pieces of wire-grid polarizers 90a,b and 92a,b may also preferentially be bevelled at approximately 45 degrees in order to enable said pieces to be placed together so as to minimise the gap between said pieces. The bevelled edges may or may not also preferentially be coated with a black-ink or otherwise in order to mitigate any optical reflections occurring from said edges.

Moreover, the orientations of the two separate pieces of wire-grid polarizers 90a,b and 92a,b are arranged such that both secondary image beams 70a,b, and 72a,b possess mutually identical optical linear polarization states which are orthogonal to the linear polarization state of the primary image beams 62a,b. Achromatic optical quarter waveplates (shown in FIG. 4) are then used to directly convert the optical linear polarization states of said primary and secondary image beams for each projector 64a,b to circular polarization.

The overall theoretical optical light efficiency of system 60 according to the present invention will now be 100%×100%=100%. However, in practice the overall optical light efficiency may be reduced to typically approximately 60% due to the occurrence of optical losses, such as surface-reflections. However, the resulting on-screen image brightness is nether-the-less significantly improved as compared to previous prior-art technologies.

Whilst preferred embodiments of the present invention have been shown and described herein, various modifications may be made thereto without departing from the inventive idea of the present invention. Accordingly, it is to be understood the present invention has been described by way of illustration and not limitation.

The invention claimed is:

1. A dual projection system for projecting a stereoscopic three dimensional image on the surface of a projection screen, comprising:
   a first projector configured to generate a left-eye image beam;
   a second projector configured to generate a right-eye image beam;
   a first beam-splitting element positioned in front of said first projector to split said left-eye image beam into a primary left-eye image beam with a first optical linear polarization state and two secondary left-eye image beams, each with a second optical linear polarization state;
   a second beam-splitting element positioned in front of said second projector to split said right-eye image beam into a primary right-eye image beam with said first optical linear polarization state and two secondary right-eye image beams, each with said second optical linear polarization state;
   a first optical quarter waveplate device configured to receive the primary left-eye image beam and two secondary left-eye image beams and to convert their optical linear polarization states to a first circular polarization orientation for projection onto the surface of a projection screen;
   a second optical quarter waveplate device configured to receive the primary right-eye image beam and two secondary right-eye image beams and to convert their optical linear polarization states to a second circular polarization orientation for projection onto the surface of a projection screen; and
   wherein said first circular polarization orientation is orthogonal to said second circular polarization orientation.

2. The system of claim 1 wherein said first beam-splitting element directs the primary left-eye image beam to travel in a direction parallel to the left-eye image beam and directs the two secondary left-eye image beams to travel in mutually opposite directions which are also orthogonal to the left-eye image beam.

3. The system of claim 2 wherein said second beam-splitting element directs the primary right-eye image beam to travel in a direction parallel to the right-eye image beam and directs the two secondary right-eye image beams to travel in mutually opposite directions which are also orthogonal to the right-eye image beam.

4. The system of claim 3 wherein the first and second beam-splitting elements each comprise two pieces of planar wire-grid polarizers which mutually intersect along an edge at an angle of substantially 90 degrees.

5. The system of claim 3 further including a first pair of reflecting mirrors which receive the two secondary left-eye image beams and direct them to travel in a direction parallel to said left-eye image beam.

6. The system of claim 5 further including a second pair of reflecting mirrors which receive the two secondary right-eye image beams and direct them to travel in a direction parallel to said right-eye image beam.

7. The system of claim 1 wherein the first optical quarter waveplate device comprises an optical quarter waveplate element for each of the primary left-eye image beam and two secondary left-eye image beams to convert their optical linear polarization states to a first circular polarization orientation.

8. The system of claim 7 wherein the second optical quarter waveplate device comprises an optical quarter waveplate element for each of the primary right-eye image beam and two secondary right-eye image beams to convert their optical linear polarization states to a second circular polarization orientation.

9. The system of claim 8 wherein the properties of the optical quarter waveplate elements of the first and second optical quarter waveplate devices are substantially achromatic.

10. The system of claim 9 wherein optical quarter waveplate elements of the first and second optical quarter waveplate devices each comprises a stack of at least three separate uniaxially stretched retardation sheets.

11. The system of claim 1 wherein the first optical linear polarization state and said second optical linear polarization state are mutually orthogonal.

* * * * *